UNITED STATES PATENT OFFICE.

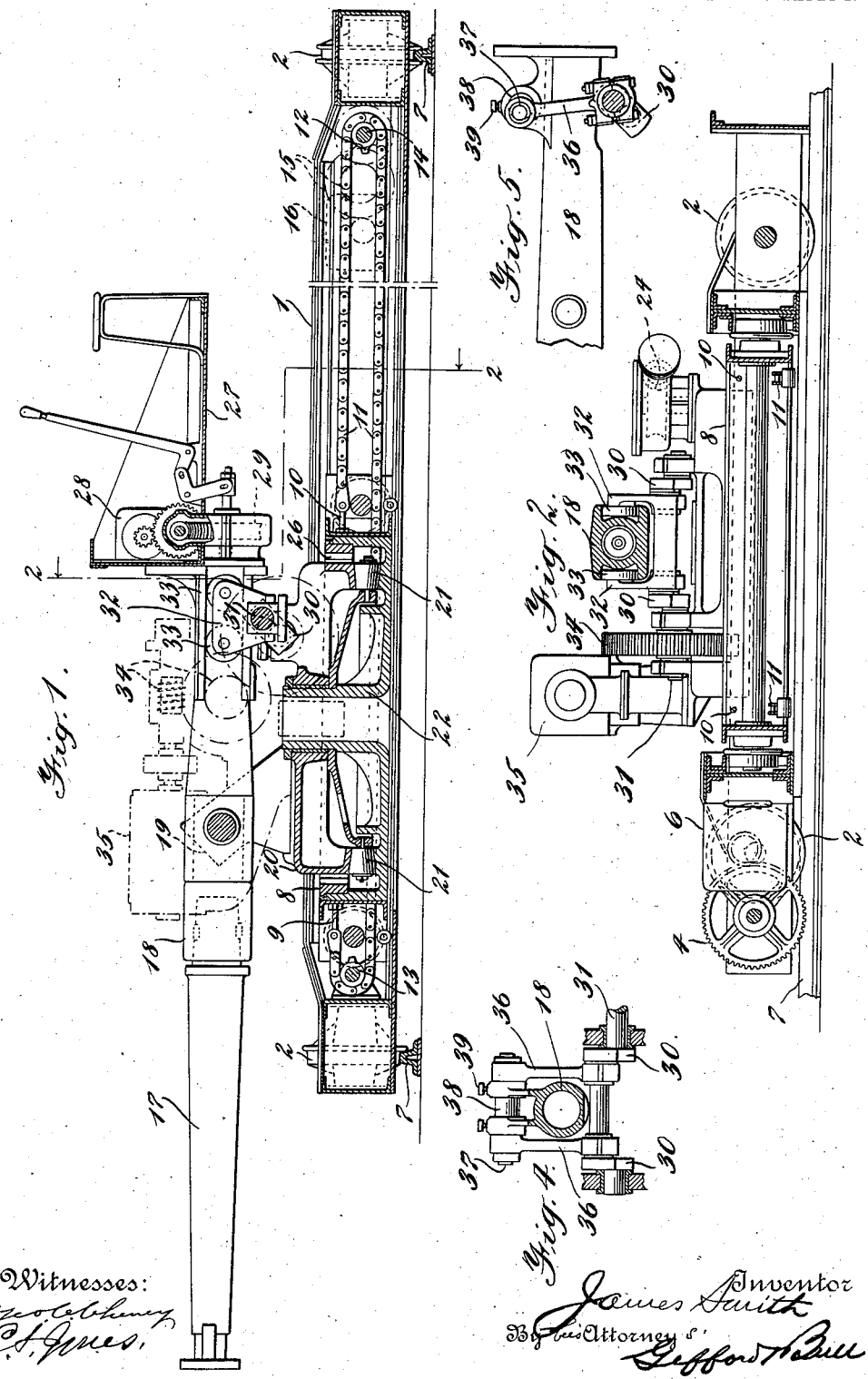

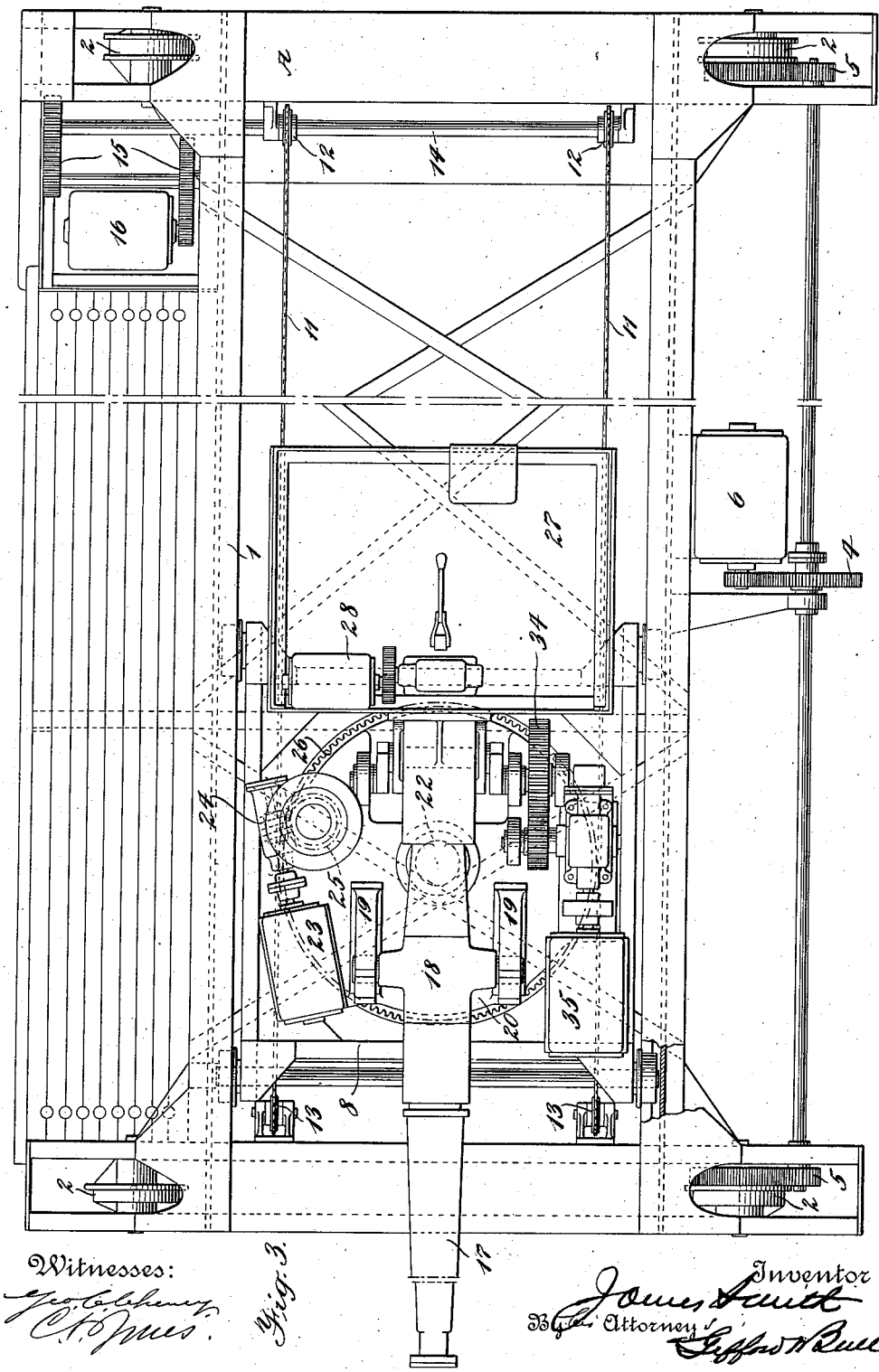

JAMES SMITH, OF EALING, ENGLAND, ASSIGNOR TO BABCOCK & WILCOX COMPANY, OF BAYONNE, NEW JERSEY, A CORPORATION OF NEW JERSEY.

APPARATUS FOR CHARGING OPEN-HEARTH FURNACES, &c.

1,028,619.   Specification of Letters Patent.   Patented June 4, 1912.

Application filed January 13, 1912. Serial No. 671,069.

*To all whom it may concern:*

Be it known that I, JAMES SMITH, a subject of the King of Great Britain, residing at Ealing, in the county of Middlesex, England, have invented certain new and useful Improvements in Apparatus for Charging Open-Hearth Furnaces and the Like, of which the following is a specification.

This invention relates to improvements in machines for charging open-hearth or similar furnaces, of the kind including a movable structure on which runs a carriage carrying a platform rotatable on a vertical axis and on which is mounted a charging arm or bar adapted to be tilted on a transverse horizontal axis and to be rotated or oscillated on a longitudinal axis.

The present invention consists more particularly in improved devices hereinafter particularly described for traversing the said carriage and for tilting the charging arm.

In the accompanying drawings Figure 1 is a part elevation, part longitudinal vertical section of a charging machine of the kind referred to equipped with the improvements; Fig. 2 is a cross section on the line 2—2 Fig. 1, and Fig. 3 is a plan of the machine. Figs. 4 and 5 show details of a modification.

Referring to the drawings, the charging apparatus comprises a main traveling structure 1 made up of suitably braced I-beams or the like resting on wheels 2 adapted to be rotated in known manner, through the intermediary of suitable gearing 4—5, from an electric motor 6, whereby the said structure may be traversed along stationary rails 7 disposed parallel to the furnace front.

Mounted to run on the structure 1 in a direction at right angles to the line of movement of the structure, that is, toward or away from the furnace opening, is a carriage 8 to which are connected at 9 and 10 the ends of sprocket chains 11, said chains being led around sprocket wheels 12 and 13. The sprocket wheels 12 are fast on a shaft 14 mounted in bearing on the main structure 1, said shaft being rotated through gearing 15 driven from an electric motor 16, said gearing and motor being located to one side of and at the rear of the structure 1, so that the component parts thereof are readily accessible and out of the dangerous heat from the furnace. It will be understood that the motor 16 and gearing 15 will participate in the movement of the structure 1 and be stationary relatively to the carriage 8, the gearing, chain connections, etc., acting positively to traverse the carriage.

The charging arm 17 is supported within a hollow bearing 18 having journals fitted in brackets 19 mounted on a turn table 20 which is mounted on the carriage 8. The turn table 20 rests upon bearings 21 and is adapted to turn about a central bearing 22. On this turn table is mounted an electric motor 23 which drives a worm gearing 24 and a gear 25 (see Fig. 3) the latter meshing with a fixed internal gear 26 on the carriage.

In addition to the rotation of the charging arm 17, through the rotation of the turn table, the said arm has an independent movement of rotation on its longitudinal axis through the following mechanism. The rearward extension of the bearing 18 supports a platform 27 on which is supported an electric motor 28 driving a suitable train of gearing, the worm wheel 29 of which is fast on the shaft of the charging arm. The charging arm is also capable of a tilting movement on a transverse horizontal axis. As above stated the bearing 18 has journals fitted in brackets 19 and said bearing is tilted by means of a crank 30 secured to a shaft 31 located beneath bearing 18. To said crank are connected arms 32 provided with rollers 33 engaging guides on the rear portion of the bearing 18. The crank shaft is driven through gearing 34 from an electric motor 35, the gearing being kept as low as possible relatively to the charging arm at one side thereof so as to afford an uninterrupted view of the charging arm and the load carried thereby when the furnace is being charged. It will be understood that the devices for tilting the charging arm operate on the same from below. As an alternative means for tilting the charging arm, the crank 30 may be connected to the rear end of the bearing 18 by means of a connecting rod or rods 36 engaging an eccentrically turned portion or portions 37 on a circularly adjustable pin 38 fitted in the bearing 18, (see Figs. 4 and 5) the adjustment of said pin being equivalent to adjustment of the charging arm relatively to the crank, whereby the extent of movement of said arm may be varied if desired. The pin 38 may be held in any desired position by means of a set screw or set screws 39 or the like.

It will be observed that the arrangement of apparatus above described insures greater compactness of the gears for operating the charging arm.

What I claim and desire to secure by Letters Patent of the United States, is:

1. In an apparatus of the character described, the combination of a main traveling structure, a carriage mounted thereon, a charging arm supported on said carriage, and means for traversing the carriage on said structure comprising a motor located at one side of said structure adjacent the rear thereof, and operative connections between said motor and carriage, said motor and connections participating in the movement of the structure, but being stationary relatively to the carriage.

2. In an apparatus of the character described, the combination of a main traveling structure, a carriage mounted thereon, a charging arm supported on said carriage, a motor located at one side of said structure adjacent the rear thereof, a shaft along the side of said structure, gearing connecting said motor and shaft, and drive chains from said shaft connected to said carriage, said motor, gear and shaft participating in the movement of the structure but being stationary relatively to the carriage.

3. In an apparatus of the character described, the combination of a main traveling structure, a carriage mounted thereon, a charging arm supported on said carriage, means for traversing the carriage on said structure, and means for tilting the charging arm comprising a crank located beneath the charging arm, operative connections interposed between said crank and the charging arm, and means for driving said crank.

4. In an apparatus of the character described, the combination of a main traveling structure, a carriage mounted thereon, a charging arm supported on said carriage, means for traversing the carriage on said structure, and means for tilting the charging arm comprising a crank located beneath the charging arm, and arms provided with rollers connected to said crank and engaging guides on the rear of the bearing of the charging arm, and means for driving said crank.

5. In an apparatus of the character described, the combination of a main traveling structure, a carriage mounted thereon, a charging arm supported on said carriage, means for traversing the carriage on said structure, means for tilting the charging arm comprising a crank located beneath the charging arm, operative connections interposed between said crank and the charging arm, means for adjustably attaching said connections to the charging arm, and means for driving said crank.

In testimony whereof I have hereunto signed my name in the presence of two subscribing witnesses.

JAMES SMITH.

Witnesses:
ROBERT SHAW FOX,
HENRY PELHAM SMITH.

---

Copies of this patent may be obtained for five cents each, by addressing the "Commissioner of Patents, Washington, D. C."